United States Patent [19]

Lundin

[11] Patent Number: 4,552,274

[45] Date of Patent: Nov. 12, 1985

[54] TRICYCLE AND A TOY CRANE ASSEMBLY REMOVABLY MOUNTED THEREON

[76] Inventor: Lawrence R. Lundin, 10057 Highway 2, Rapid River, Mich. 49878

[21] Appl. No.: 567,511

[22] Filed: Jan. 3, 1984

[51] Int. Cl.$^4$ .............................................. B66C 23/06
[52] U.S. Cl. ...................................... 212/232; 212/241; 212/244; 446/426; 446/427
[58] Field of Search ............... 212/192, 193, 211, 223, 212/227, 229, 231, 232, 237, 239, 241, 255, 263, 265; 446/426–427

[56] References Cited

U.S. PATENT DOCUMENTS

| | | | |
|---|---|---|---|
| 905,463 | 12/1908 | Ryin | 212/241 |
| 2,961,103 | 11/1960 | Ward | 212/241 |
| 3,104,015 | 9/1963 | Goldfarb | 212/241 |
| 3,455,464 | 7/1969 | Neils | 212/246 |
| 3,499,542 | 3/1970 | Turner | 212/239 |

*Primary Examiner*—Galen L. Barefoot
*Assistant Examiner*—R. B. Johnson
*Attorney, Agent, or Firm*—Cushman, Darby & Cushman

[57] ABSTRACT

A toy crane attachment for use with a child's tricycle. The crane includes a main mounting frame which can be easily attached to or removed from the tricycle. The main frame pivotally supports a swivelable frame and boom, with the boom thereby being movable not only horizontally relative to the tricycle, but through all of a crane's vertical motions. The child will operate the crane by turning around and facing the rear of the tricycle with crane operation thereafter simulating actual crane operation.

3 Claims, 3 Drawing Figures

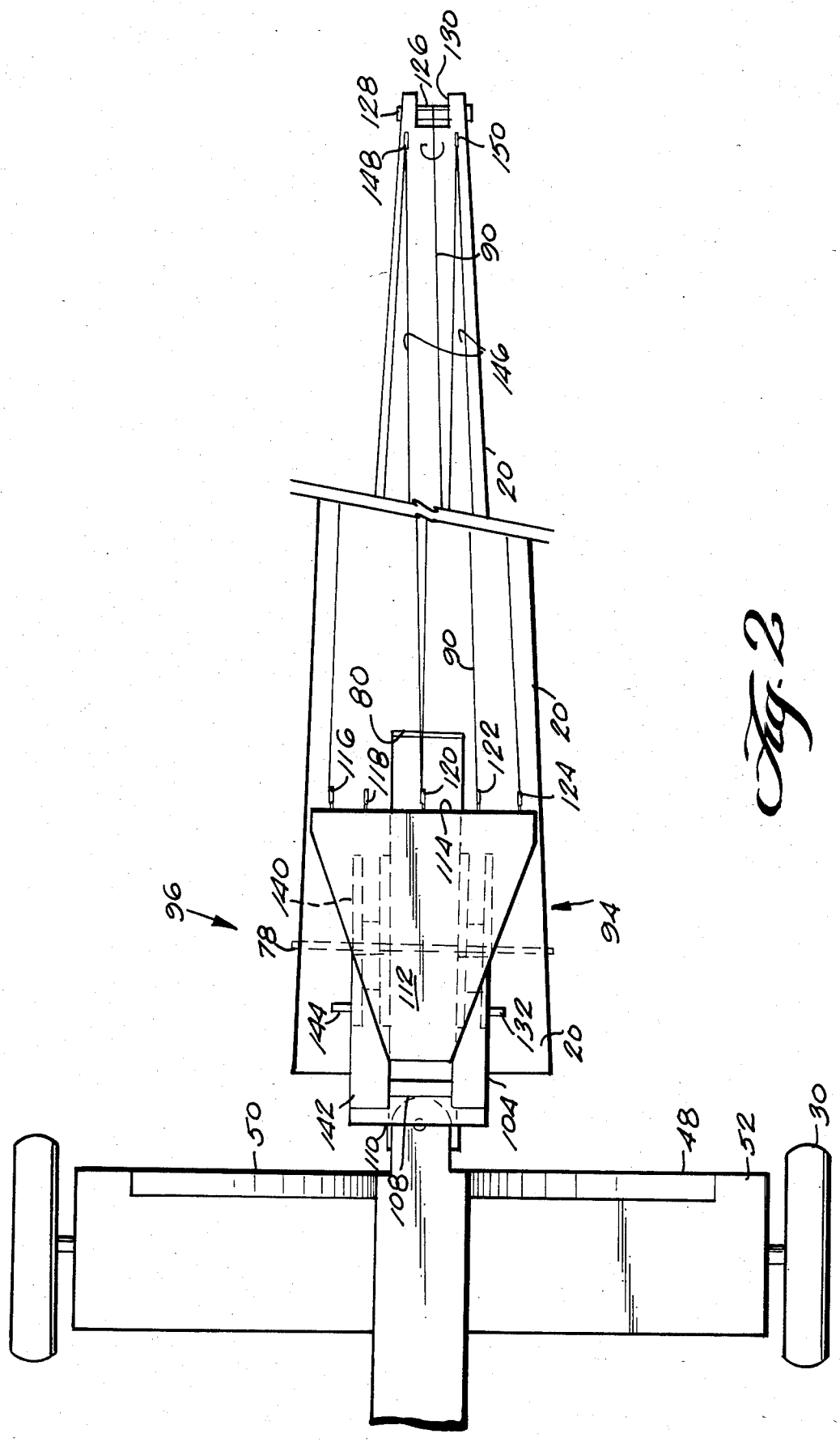

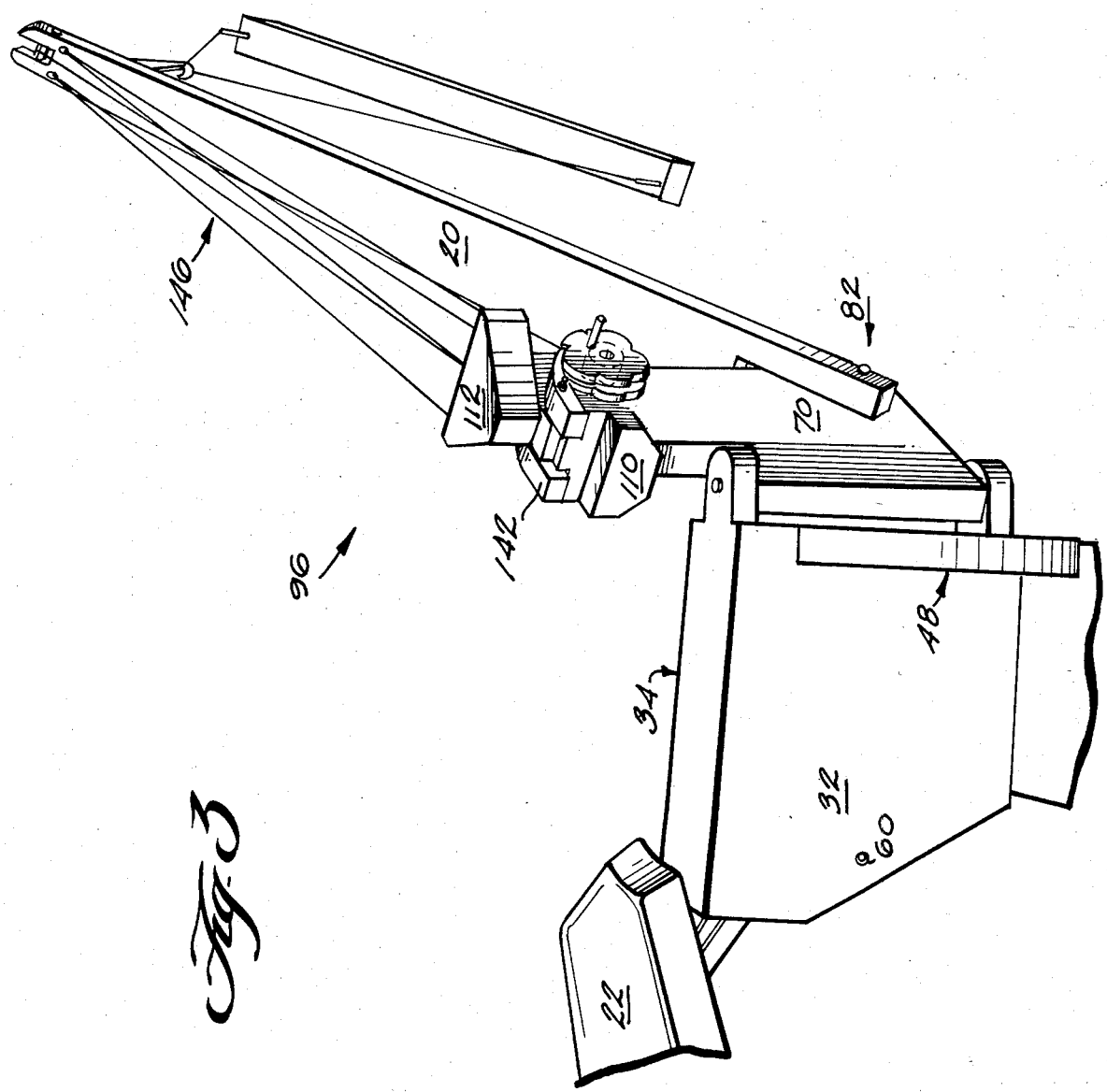

TRICYCLE AND A TOY CRANE ASSEMBLY REMOVABLY MOUNTED THEREON

FIELD OF THE INVENTION

The present invention deals with a crane attachment for use with a tricycle, the crane having a fully operable boom and a main running line for lifting.

BACKGROUND OF THE PRESENT INVENTION

Structural cranes in use on various type of construction jobs, of course, are characterized by the ability to move objects not only vertically, but also to move them horizontally from a first to a second position. This requires that the crane body and the boom itself be easily pivotable between a variety of a combination of positions so that the object being lifted can be grasped from whatever position it is in and subsequently deposited at a second desired position. Such a result is also desirable in a toy crane attachment for a child's tricyce.

Attempts have been made over the years to provide various types of crane or lifting attachments for use with tricycles, but none have met with the success in duplicating crane features as does the present invention nor do they disclose the structure of the toy crane attachment of this invention.

Exemplary of two prior art structures are Ewers, U.S. Pat. No. 2,630,334, and Jackson, U.S. Pat. No. 3,222,034. Both show crane type devices that are attachable to the rear tricycle but neither show the particular combination of structural elements set forth in the present invention. While both show the use of crank-type mechanism together with a chain or line attached to a lifting hook, the Ewers main frame, in the form of an A-shaped bent piece of metal tubing which is secured to the cross step above the axle of the tricycle, is not easily raisable or lowerable since raising and lowering of that A-frame section requires removal of the seat.

In Jackson, the device shows a fixed boom or hoist member which can attach to the rear of a tricycle and the attachment procedure does not allow subsequent movement of the boom member but only permits a lift line to be cranked.

Stevens, U.S. Pat. No. 2,209,359, discloses a child's toy crane that will stand by itself. The crane includes a flat base member from which a plurality of feet can be swiveled out to support the crane. A vertical member is pivotally fastened to the base and a boom is hinged to the vertical member. The position of the boom can be controlled by a reel and line combination and in a similar fashion, the position of the lifting hook on the boom can be controlled by second reel and line combination fixed only to the boom.

Proctor, U.S. Pat. No. 2,843,360, and Pilot, U.S. Pat. No. 3,001,763, both show crane type structures that could be mounted to a wagon. Neither is pivotable in a horizontal direction although Proctor shows a vertically pivotable boom member. The boom in Pilot is hinged at the rear so that it can be bent forward into the wagon, out of the way when not being used.

Wormser et al, U.S. Pat. No. Des. 228,358; Chabot, U.S. Pat. No. 4,224,007, and Magnusson, U.S. Pat. No. Des. 267,100, relate to various types of toy excavators or shovels. Wormser et al shows a fixed back hoe type of play apparatus whereas Chabot and Magnusson both show play type back hoes or shovels with each having its seat and back hoe pivotably connected to a base member.

Finally, Morehead, U.S. Pat. No. 3,152,838, shows a dump truck attachment for a tricycle.

SUMMARY OF THE PRESENT INVENTION

The present invention relates to a toy crane adapted to be mounted to and removed from the rear of a tricycle. Specifically, the toy crane includes a main frame assembly which will fit around the rear frame member from the seat of the tricycle toward the rear wheels and includes attaching means that will fit therearound to hold the main frame in position. The main frame also includes an outwardly extending support system that rests on the rear step or foot plate that usually extends between the rear wheels of the tricycle. This main frame includes an upper and lower member each of which extend out beyond the edge of the vertical portions thereof, the outward extension being in a direction away from the tricycle. The portions of those upper and lower members which extend out beyond the rear edge of the vertical part of the main frame comprise part of the pivot support for a swivel frame member that will fit therein. The swivel frame, which extends rearwardly from the main frame, is fully pivotable through at least 180° relative to the main frame at the rear of the tricycle.

The swivel frame serves to pivotally support the crane boom and a pair of control reels together with spring controlled pawls which work with the toothed outer periphery of the reels to permit easy adjustment in one direction but to prohibit rotation in the opposite direction unless the pawl is raised out of engagement with the toothed outer rim. At the top of the swivel frame, a tension adjustment lock is provided. A running line extends from one of the adjustment reels through a centering control adjacent that reel and over a pulley at the end of the boom and down to the object engaging hook so that objects can be engaged and raised or lowered. A separate line extends from the other reel through a series of guides and then to the boom itself and back to an adjustment block where one end is secured for purposes of controlling the boom in a way that tries to recreate a pulley system and thus gives the user not only good control over the boom position in operation, but also the feel and effect of those pulleys.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 2 is a top, plan view of the toy crane shown in FIG. 1; and

FIG. 3 is a view, partially in perspective, of the crane holding an item and with the swivel frame and boom in a swiveled condition.

DETAILED DESCRIPTION OF THE PREFERRED EMBODIMENT OF THE PRESENT INVENTION

Figure 1:
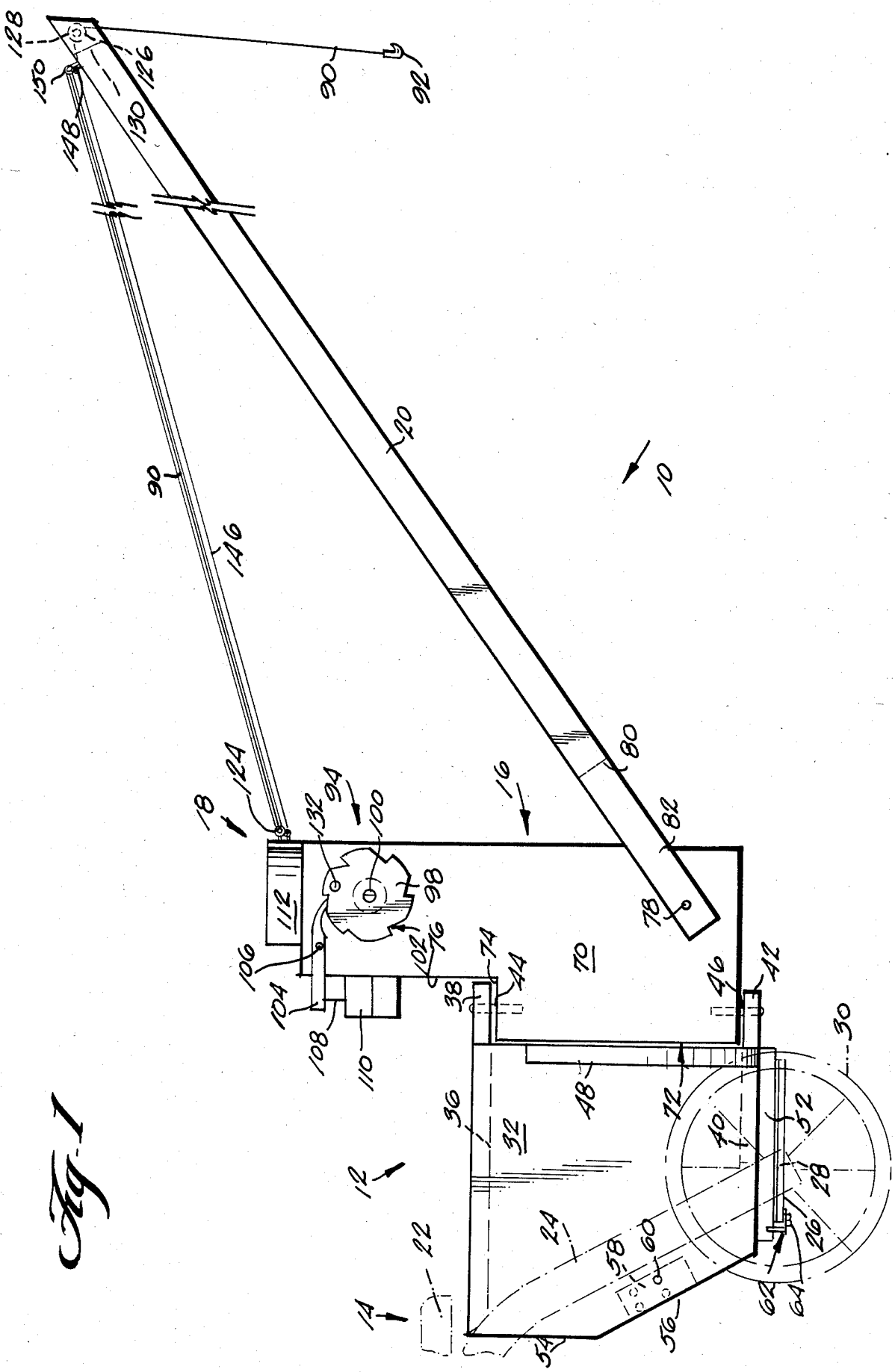
FIG. 1 is a side, elevational view of the toy crane according to the present invention.

Turning now to FIG. 1, the toy crane according to the present invention, generally indicated at 10, is comprised of a main frame assembly generally indicated at 12, which will be removably connected to a tricycle 14, a swivel frame assembly, generally indicated at 16, a tensioning or control assembly, generally indicated at 18, and a boom 20. Tricycle 14 includes a seat 22 and a depending, tubular frame member 24, which terminates at a foot rest or step 26 which, in turn, supports an axle 28 for wheels 30. Main frame assembly 12 includes right and left side panels 32 and 34 and connected between the panels 32 and 34 at the top is a top, horizontal member 36 having an end portion 38 that extends rearwardly away from tricycle 14 beyond panels 32 and 34. A lower member 40 has a comparable rearwardly extending portion 42.

As shown in FIG. 2, the extended portions 38 and 42 of the top and bottom main frame members, provide the pivotal support for the swivel frame assembly 16, the latter being retained for that pivotal movement by means of swivel pins 44 and 46.

Extending outwardly to the side of each of the side plates 32 and 34 are support brackets 48 and 50, respectively, and a separate crane foot rest 52 which extends beneath panels 32 and 34 and is dimensioned to fit between wheels 30 and on top of tricycle step 26. Each of the support brackets 40 and 50 is connected to both a respective side panel 32 or 34 and the top front edge of foot rest 52.

As shown in FIG. 1, the front portion of panels 32 and 34 is provided with a straight, vertical edge 54 and an angled edge 56 with those edges being appropriately designed to fit a variety of tricycles and, of course, are designed to fit a bicycle having a tubular frame as shown.

Inserted between panels 32 and 34, adjacent angled edge 56 is a holding block 58, held in place by one holding pin 60. Number 58 block has four holes in it, making it adjustable for different makes and sizes of bikes. In addition, one or more fastening brackets 62 are provided adjacent the rear bottom edge of foot rest 52 so that through the use of fastening bolts 64, foot rest 52 can be secured to the tricycle step 26. Thus, between holding block 58 and fastening brackets 62, crane 10 can be securely fastened to tricycle 14.

As exemplary dimensions, the length of upper member 36 can be about $9\frac{1}{4}''$ whereas the overall vertical height of the main frame assembly 32 is about $8\frac{1}{2}''$. That would allow edge 54 to be about 3" long and edge 56 to be about 5" long. Similarly, the foot rest 52 can be about 5" wide and the distance between the interior surfaces of extensions 38 and 42 can be about $5\frac{1}{8}''$.

While this portion of the crane 10 can be constructed from a variety of materials, exemplary and preferred materials include wood and molded plastic parts.

SWIVEL FRAME ASSEMBLY

Swivel frame assembly 16 is comprised principally of a generally L-shaped panel 70 having an extension portion, generally indicated at 72, which defines an upper edge 74 and a rear vertical edge 76. The extension portion 72 fits between the main frame extensions 38 and 42 and is engaged by swivel pins 44 and 46 as shown in phantom in FIG. 1.

Boom 20 is pivotably connected to the bottom of the L-shaped panel by means of a pin 78. In particular, the bottom end of boom 20 is provided with a U-shaped opening 80, as shown in FIG. 2, defined by two legs 82 and 84 with leg 82, of course, being on one side of the L-shaped panel 70 and leg 84 being on the opposite side.

Panel 70 also serves to support the tension and control assemblies, which are generally indicated at 18.

Tensioning and control assemblies 18 include one control assembly 94 for the main running line 90, which attaches to the pickup hook 92. Assembly 94, as shown in FIG. 1, is located on one side of panel 70. The other tensioning assembly, generally indicated at 96 in FIG. 2, controls the operation of boom 20, that is, its raising and lowering.

Tensioning assembly 94 is comprised of an adjustable reel 98, rotatably mounted to panel 70 by pin 100. Reel 98 is provided with a toothed periphery, for example as shown at 102, with the plurality of such teeth serving to work with a pawl 104 which is pivotably mounted to panel 70 by mounting pin 106. A foam rubber spring 108 is provided between the exterior of pawl 104 which extends outwardly beyond surface 76 of panel 70 with the foam rubber 108 being retained in place, by any convenient means such as a suitable adhesive, on a holding block 110 itself being suitably secured to panel 70, as for example by screws (not shown).

Mounted to the top of panel 70 is a tensioning block 112 that can be attached to panel 70 by any convenient means such as bolts, screws or adhesives or any combination thereof. The front face of 114 of block 112 supports a plurality of line guides 116, 118, 120, 122 and 124. As best shown in both FIGS. 1 and 2, line guide 122 is used for guiding the main running line 90 and serves to keep that line in a centered position with respect to reel 98. Line 90 extends from reel 98, to which one end is securely attached at the interior of that reel, through line guide 122 outwardly across boom 20 and over a guide roller 126 rotatably mounted at the end of boom 20 by pin 128. Specifically, roller 126 fits and freely rotates within a U-shaped opening 130 at the end of boom 20.

Reel 98 is provided with an outwardly extending handle 132 and, as can be seen from FIG. 1, reel 98 can be freely turned in a clockwise direction with pawl 104 being moved against the effects of the foam spring 108 as the front end of pawl 104 moves against teeth 102. When pawl 104 directly engages one of the teeth 102, it will prevent counterclockwise movement of reel 98. Thus, to move reel 98 in a counterclockwise direction, the crane operator will have to press the rear end of pawl 104 downwardly against the effect of the foam spring 108 thereby raising the front tip out of engagement with the toothed periphery of reel 98. This will allow reel 98 to be turned in a counterclockwise direction. Subsequent release of pawl 108 will allow the foam spring to move the pawl back to its engagement position where the front end will again engage the toothed periphery and prevent further counterclockwise movement. With the running line 90 being wound on reel 98 as shown, clockwise movement of the reel will tend to raise hook 92 whereas counterclockwise movement of reel 98 will lower hook 92.

Tensioning assembly 96 includes a second adjusting wheel, as shown in FIG. 2 at 140, together with a second pawl 142 which is separately pivotally attached to panel 70 in a manner similar to that for pawl 104. Likewise, the rear portion of pawl 140 will also contact the upper surface of foam spring 108 and its operation will proceed in a similar manner. Reel 140 is also provided with a handle 144 and its operation, while independent of reel 98, will occur in a similar manner with respect to its clockwise and counterclockwise rotation.

Reel 140 holds a supply of the boom line 146 and as was the case with line 190, one end of boom line 146 is securely fixed to the interior of reel 140. Thereafter, the threading of boom line 146 is perhaps best shown in FIG. 2 and will first pass from reel 140 through line guide 118 and then directly through line guide 116. From line guide 116 it passes through a line guide 148 at the outer end of boom 20 and then back to the center line guide 120 on block 112, then in a continuous fashion from guide 120 back again to the end of boom 20, through a second line guide 150 at the outer end of boom 20 and from there back to line guide 124 to which it is secured. Line guide 118 serves to maintain boom line 146 in a centered condition with respect reel 140 and the combined effects and feel of the additional line guides allows the boom control and tensioning system to operate in a manner similar to that of a pulley system. This system of control provides both a good control and that of feel for boom positioning.

While a variety of diameters can be used for the hub portion of reel 140, a hub diameter of about $1\frac{1}{2}''$ would allow seven complete revolutions of the reel to fully raise the boom from an initial flat or horizontal position to a total "up" or vertical position.

Panel 70 can be comprised of the same material as the main frame 12, either wood or preformed or molded plastic, and the same is true with respect to boom 20 although other materials such as metal or alloys could also be used. Reels 98 and 140 together with pawls 104 and 142 can also be comprised of wood or plastic or any other sturdy material, including metal, depending upon the objective to be achieved, either from the standpoint of appearance or use. The line guides referred to above are preferably eyelets with an integrally formed, threaded shank although other conventional types of line guides could be also used, it being important that each of the lines be securely held in place and not slip out of their desired positions.

Panel 70 can be approximately $5\frac{1}{2}''$ wide and $12\frac{1}{2}''$ high, measuring to the top of block 112 which itself can be about 3" in length from front to rear, measuring rearwardly from forward face 114. Boom 20 can be approximately 30" long and preferably tapers from the front or outer end back to legs 82 and 84. In addition, reels 98 and 140 can have approximately a 3" outer diameter and a $1\frac{1}{2}''$ to 2" hub diameter, with the length of pawls 104 and 142 being approximately $2\frac{3}{4}''$ long. Foam spring 108 is approximately $\frac{3}{4}''$ to 1" in thickness and is preferably formed from a foam rubber material although other arrangements could be provided, including an enclosed spring or a piece of rubber. It is important that the rear end of the pawls be kept in an up position in order to maintain the front tip within the toothed exterior of the adjusting reels and the amount of effort desired to raise the front tip out of that engagement.

While the invention has been described in connection with what is presently considered to be the most practical and preferred embodiment, it is to be understood that the invention is not to be limited to the disclosed embodiment, but on the contrary, is intended to cover various modifications and equivalent arrangments included within the spirit and scope of the appended claims, which scope is to be accorded the broadest interpretation so as to encompass all such modifications and equivalent structures.

What I claim is:

1. In combination, a tricycle and a toy crane assembly removably mounted to the rear of said tricycle, said crane assembly including a main frame member, means for removably mounting said main frame member to said tricycle, a swivel frame member pivotally mounted to said main frame member, a boom member pivotally attached to said swivel frame member and having a free outer end, boom adjustment means mounted on said swivel frame for changeably adjusting the position of the boom member relative to the swivel frame member, said boom adjustment means including a boom line extending from said swivel frame to the outer end of said boom, and running line adjustment means mounted to said swivel frame for adjustably operating a running line, said boom adjustment means icluding a first reel member rotatably mounted to the top of said swivel frame member for holding a supply of boom line, said first reel having a toothed periphery, a first pawl pivotally mounted adjacent said first reel member, resilient means for keeping said first pawl in an engaged position relative to said reel and line guide means for guiding the boom line between said first reel member and said boom member, said line guide line means further including centering means for keeping the boom line in the center of said first reel member, said running line adjustment means including a second reel member rotatably mounted to said swivel frame member for holding a supply of running line, said second reel member having a toothed peripheral rim, a second pawl mounted adjacent said second reel member, resilient means for keeping said second pawl in a pawl engaged position and second line guide means for guiding the running line.

2. A toy crane tricycle attachment as in claim 1, wherein said second reel member and said second pawl are positioned adjacent the top of said swivel frame member and on the opposite side thereof from said first reel member and said first pawl so as to be mounted directly opposite said first reel member and said first pawl.

3. A toy crane tricycle attachment as in claim 1 further including a block member mounted to said swivel frame member and serving to support at least part of said boom adjustment means and said running line adjustment means.

* * * * *